Jan. 2, 1945. C. SHOREYS 2,366,461
ROTARY SHAFT COUPLING
Filed July 4, 1942
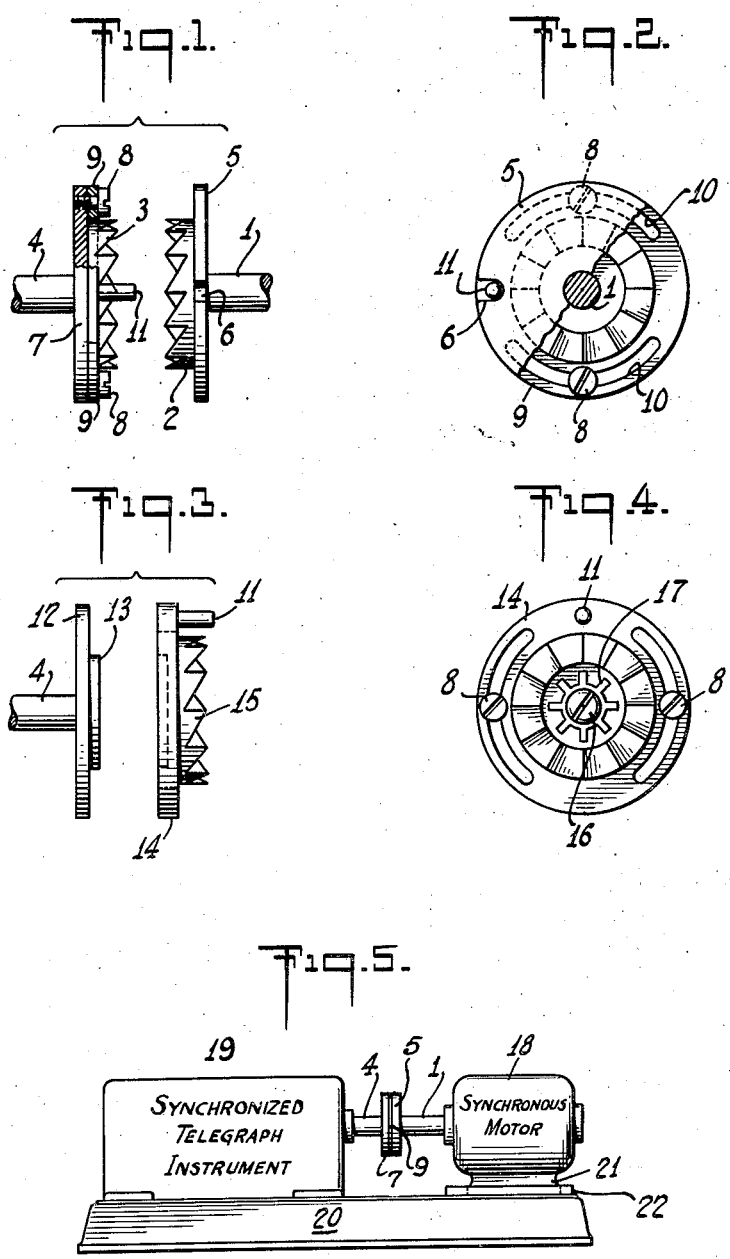
INVENTOR.
CHARLES SHOREYS
BY
ATTORNEY Patented Jan. 2, 1945

2,366,461

UNITED STATES PATENT OFFICE 2,366,461

ROTARY SHAFT COUPLING

Charles Shoreys, St. Albans, N. Y., assignor to Radio Corporation of America, a corporation of Delaware Application July 4, 1942, Serial No. 449,721

9 Claims. (Cl. 178—69.5)

This invention relates to rotary shaft couplings and more particularly to a mechanical structure for interlocking a drive shaft and a driven shaft in any desired phase relation.

My invention has been found particularly useful in connection with the coupling of a synchronized telegraph instrument to a synchronous motor. In such an application, it is important that the cyclic operation of the telegraph instrument shall be adjusted so as to send out or to receive signals in proper timed relation to a cyclic operation of other instruments in the telegraph system. It is usual in such cases to employ synchronous motors, the power for which is obtained from any suitable source, the frequency of such source being accurately controlled. In practice, a receiving instrument must be synchronized and phased with the incoming signals. The signals originating at the transmitting station must be also maintained in accordance with a cyclic operation of the transmitting apparatus as controlled by a synchronous motor, which in turn is driven from a frequency-regulated A. C. source.

In adjusting the phase of operation of one telegraph instrument to another, it is common practice first to start all the necessary motors and then to adjust the phase of each individual instrument for optimum conditions of synchronous operation. If, on a test run, it is found that any instrument is out of phase, then the driving motor for that instrument may be uncoupled from the driven shaft and recoupled in a new phase relation. By sliding the motor axially along the base common to the motor and the telegraph instrument, two coupling members may be separated and then re-engaged with each other. While the coupling members are separated, it is possible, in practicing my invention, to accurately adjust the phase angle of a phase-positioning member so that when the couplings are reengaged, the proper phase relation will be established and maintained.

It is an object of my invention, therefore, to provide a simple and readily adjustable rotary shaft coupling such as will be suited to the requirements of phase adjustment of a driven shaft with respect to a drive shaft.

It is another object of my invention to provide rotary shaft coupling means for suitably establishing and maintaining a desired phase relation between the shaft of a motor and the driven shaft of a telegraph instrument. The term "telegraph instrument" as herein employed refers to either transmitting or receiving apparatus.

Further objects of my invention will be made manifest in the description to follow. In this description, also, certain advantages of the invention will be brought out.

The description is accompanied by a drawing, in which:

Fig. 1 shows a side view of certain rotary shaft coupling members mounted on drive and driven shafts respectively, in accordance with my invention;

Fig. 2 shows an end view corresponding to the side view of Fig. 1;

Fig. 3 shows a side view of a modified arrangement of my rotary shaft coupling members;

Fig. 4 shows an end view of the modified structure in accordance with Fig. 3; and Fig. 5 shows an assembly view of a rotary shaft coupling system to be used in combination with a synchronous motor and a synchronized telegraph instrument.

Referring first to Figs. 1 and 2, I show therein a drive shaft 1 which may be the shaft of the motor if desired. On the end of this shaft is a clutch member 2 having a crown-toothed face suitably formed for engagement with a complementary crown-toothed clutch member 3, the latter being fixedly mounted on a driven shaft 4. The clutch member 2 is backed by a flange 5 of greater diameter. This flange is recessed at one part of its periphery as shown at 6.

The clutch member 3 is formed integrally with a flange 7 having preferably two screw holes into which screws 8 are threaded. Between the heads of the screws 8 and the flange 7, I have provided an adjustable flange member 9 which may be in the form of a flat plate or disk having arcuately formed slots 10 therein. The width of these slots is sufficient to receive the bodies of the screws 8.

A single pin 11 is fixedly mounted to extend outwardly from the face of the flange 9. The axis of the pin 11 is parallel to the common axis of the shafts 1 and 4 and is radially disposed in a suitable position for insertion in the slot 6 of the flange 5.

The number of teeth in the clutch members 2 and 3 respectively correspond, and they are similarly formed preferably as saw-teeth. When the clutch members 2 and 3 are interlocked, therefore, they transmit the power from shaft 1 to shaft 4. The function of pin 11, however, is merely to provide a single angular phase relation to be established between the shafts 1 and 4. This phase relation may, however, be adjusted to suit operational requirements by loosening the screws 8 and setting the disk or plate 9 in any desired angular position with respect to the flange 7. When the proper adjustment is found, the screws 8 are then tightened and thereafter the coupling members may be interlocked or disengaged at will without disturbing the phase relation which is to be maintained between the shafts 1 and 4, and without stopping the rotation of the drive shaft 1.

Referring now to the modification shown in Figs. 3 and 4, I have indicated therein only the members which are to be associated with the driven shaft 4, since the clutch member 2 and flange 5 mounted on the end of shaft 1 may be the same as shown in Figs. 1 and 2.

The member 12 is of flange formation having a disk 13 formed integrally therewith. The disk 13 is of smaller diameter than the flange 12. Both are fixedly mounted on the end of the driven shaft 4. A clutch member 14, 15 takes the place of members 3 and 9 in Fig. 1. In other words, the crown-toothed clutch portion 15 and the disk portion 14 are integrally formed. The disk portion 14, however, is recessed for nesting the disk 13 therein.

The pin 11 as shown in Fig. 3 is mounted on the disk 14 in the same manner as indicated with respect to the mounting of said pin on the plate 9 in Fig. 1. This difference exists, however, between the embodiment shown in Fig. 3 and that of Fig. 1; the teeth of clutch member 15 are maintained in fixed phase relation to the pin 11 as shown in Fig. 3 whereas, in Fig. 1 this phase relation is not definitely fixed. In accordance with some operational requirements, it may not always be necessary to provide a very accurate phase adjustment. Hence the selection permitted by interlocking different complementary teeth of the clutch members may be sufficient. For fine adjustments, the arrangement shown in Fig. 3 has the advantage over that of Fig. 1 in that definite phase adjustment even less than the angle between two saw-tooth faces may be obtained.

Referring to Fig. 4, I have shown an arrangement for more firmly clamping together the elements 12 and 14 than might be permitted by means of the clamping screws 8 alone. The clamping action is here supplemented by a screw 16 threaded into the center of the flange 12. A star washer or other lock washer 17 is preferably used under the head of the screw 16. In this manner, the clamping strain may be distributed between the screws 8 and 16 for maintaining a fixed phase relation between the elements 12 and 14.

Referring to Fig. 5, I show by way of illustration a practical application of my improved rotary shaft coupling structure. In this figure, I show a motor shaft 1 extending outwardly from the body of a motor 18 and terminating in a clutch member and flange 2, 5. A complementary clutch member 3 is shown engaged with the clutch member 2. A driven shaft 4 is shown entering a synchronous telegraph instrument 19. Motor 18 and telegraph instrument 19 are mounted on a common base 20. The motor pedestal 21 may be arranged to slide on a track 22 for maintaining axial alignment between the shafts 1 and 4.

The arrangement as shown in Fig. 5 is such that the members 2 and 3 may be interlocked by sliding the motor 18 toward the instrument 19. Dis-engagement of the clutch members may likewise be obtained by withdrawing the motor 18, this operation being facilitated by the sliding ways of the track 22.

The simplicity of construction of my improved rotary shaft coupling device and the ease of adjustment will be apparent to those skilled in the art. Various modifications of structure may also be made without departing from the spirit of the invention. The scope of the claims, therefore, is to be interpreted as in no wise limited to the particular forms of construction herein shown and described.

I claim:

1. In combination, a drive shaft having a coupling member rigidly mounted on one end thereof, said member having a flange portion and a crown-toothed clutch portion, a coaxial driven shaft having coupling means mounted on one end thereof, means for so journaling the two said shafts that said coupling member and said coupling means interlock, an adjustable flange member having arcuately formed slots therein, a phase-positioning pin rigidly carried by said adjustable flange member and extending parallel to the axis of rotation, said coupling member being recessed to receive said pin, and screw means extending through the slots of said flange member and threaded into said coupling means, for fixing the phase relation between said drive shaft and said driven shaft.

2. The combination according to claim 1 wherein said coupling means comprises a circular disk of one diameter formed integrally with a crown-toothed clutch of lesser diameter, said clutch being adapted to mate with the crown-toothed clutch portion of said coupling member.

3. The combination according to claim 1 wherein said adjustable flange member is of a certain diameter and is formed integrally with a portion of said coupling means, which portion is constituted as a crown-toothed clutch of lesser diameter than said certain diameter, this crown-toothed clutch being adapted to mate with the crown-toothed clutch portion of said coupling member.

4. In a system for adjusting the phase of a drive shaft for a cyclically operable telegraph instrument, a synchronous motor having a coupling member mounted on the end of its rotor shaft, a telegraph instrument having a complementary coupling member mounted on the end of said drive shaft, the two said coupling members having toothed clutch faces which fit together, a disk having arcuately formed slots therein, a plurality of screws extending through said slots for adjustably clamping said disk to the second said coupling member, and a dog mounted on said disk for engagement with a recessed edge of the first said coupling member.

5. In a system for adjusting the phase of a drive shaft for a cyclically operable telegraph instrument, a synchronous motor having a coupling member mounted on the end of its rotor shaft, a telegraph instrument having a disk mounted on the end of said drive shaft, a second coupling member complementary to the first, the two said coupling members having toothed clutch faces which fit together, means including screws the bodies of which extend through arcuately formed slots in said second coupling member for clamping the same onto, and in adjustable phase relation with, said disk, and a dog mounted on said second coupling member for engagement with a recessed edge of the first said coupling member.

6. Apparatus for intercoupling two coaxial shafts comprising two crown-toothed clutch members each mounted on a flange, the flanges having a slotted disk member interposed therebetween, and one of said flanges being peripherally recessed to hold a phase-adjusting pin carried by said disk member, means for fixing one clutch member onto the end of one said shaft considered as a drive shaft, means for fixing the other clutch member onto the end of the other shaft considered as a driven shaft, means for firmly clamping together the slotted disk and the flange mounted on the driven shaft, thereby to fix the angular position which said pin is to occupy with respect to a reference point on the periphery of the driven shaft, and means for so journaling the two said shafts that the two said clutch members interlock.

7. Apparatus for intercoupling coaxially disposed drive and driven shafts comprising two crown-toothed clutch devices, one of said devices being integral with a peripherally notched flange mounted on said drive shaft, the other of said devices being carried by the driven shaft and including two disks either one of which is provided with crown teeth and a particular one of which carries a pin extending parallel to the shaft axis, means for inserting said pin in the notch of the notched flange, means for orienting one of the clutch devices with respect to the other until a desired phase relation is obtained between the two shafts, means for firmly clamping together the two disks which are comprised in said "other" device, and means for causing the crown teeth of the two said devices to interlock.

8. A system for intercoupling a drive shaft and a driven shaft comprising three flange members two of which have crown teeth formed integral therewith and one of which has arcuately formed slots therein, a pin affixed near the periphery of the slotted flange, the flange which is mounted on the drive shaft having its periphery suitably notched for insertion therein of said pin, and means for clamping together in adjustable phase relation the pin-carrying flange and one of the flanges which is mounted on the driven shaft, said means including binding screws at least two of which have their studs extending through the slots of the slotted flange.

9. A system according to claim 8 and including a third binding screw in said means disposed coaxially with respect to said shafts.

CHARLES SHOREYS.